US009151573B2

(12) United States Patent
Isola et al.

(10) Patent No.: US 9,151,573 B2
(45) Date of Patent: Oct. 6, 2015

(54) REMOTE WEAPON STATION, IN PARTICULAR FOR AIRCRAFT, SUCH AS FIXED-WING AIRCRAFT

(71) Applicant: OTO MELARA SPA, La Spezia (IT)

(72) Inventors: Andrea Isola, La Spezia (IT); Gian Battista Leonesio, La Spezia (IT)

(73) Assignee: OTO MELARA SPA, La Spezia (IT)

( * ) Notice: Subject to any disclaimer, the term of this patent is extended or adjusted under 35 U.S.C. 154(b) by 0 days.

(21) Appl. No.: 14/346,636

(22) PCT Filed: Sep. 18, 2012

(86) PCT No.: PCT/IB2012/001886
§ 371 (c)(1),
(2) Date: Mar. 21, 2014

(87) PCT Pub. No.: WO2013/041956
PCT Pub. Date: Mar. 28, 2013

(65) Prior Publication Data
US 2014/0230641 A1    Aug. 21, 2014

(30) Foreign Application Priority Data

Sep. 23, 2011   (IT) .............................. TO2011A0853

(51) Int. Cl.
| | |
|---|---|
| *F41A 27/00* | (2006.01) |
| *F41G 3/22* | (2006.01) |
| *F41A 27/26* | (2006.01) |
| *F41A 23/20* | (2006.01) |
| *F41G 3/16* | (2006.01) |
| *B64D 7/06* | (2006.01) |
| *F41A 23/24* | (2006.01) |

(52) U.S. Cl.
CPC .. *F41G 3/22* (2013.01); *B64D 7/06* (2013.01); *F41A 23/20* (2013.01); *F41A 23/24* (2013.01); *F41A 27/00* (2013.01); *F41A 27/26* (2013.01); *F41G 3/16* (2013.01); *F41G 3/165* (2013.01)

(58) Field of Classification Search
CPC ......... F41A 23/20; F41A 23/22; F41A 23/24; F41A 27/18; F41A 27/20; F41A 27/26; F41A 27/00; B64D 7/06; F41G 3/22; F41G 3/165; F41G 3/16
USPC ........................ 89/37.16, 37.17, 37.21, 37.22
See application file for complete search history.

(56) References Cited

U.S. PATENT DOCUMENTS 4,464,975 A * 8/1984 Terry et al. .................... 89/41.13
5,926,648 A   7/1999 Ayzenberg
(Continued)

OTHER PUBLICATIONS

International Search Report for International Application No. PCT/IB2012/001886 mailed Jan. 2, 2013 (2 pages).

*Primary Examiner* — Stephen M Johnson
(74) *Attorney, Agent, or Firm* — Merchant & Gould P.C.

(57) ABSTRACT

A remote weapon station (10) includes a firearm (12), which is able to fire ammunitions against a target. A remote control board or panel (14) is arranged at a distance from the firearm (12) and is configured to be activated by an operator, so as to control the firearm (12). An automatic target aiming system (32) is configured to provide the remote control board (14) with target aiming signals, which indicate the position of a target that has to be hit by the firearm (12). The remote control board (14) is assembled on a platform (18) which is adapted to be fitted to an aircraft. A support element (28) mounts on the platform (18) and supports the automatic target aiming system (32) and houses the adjustable firearm (12) in a controlled way by the remote control board (14) as a function of the target aiming signals.

9 Claims, 2 Drawing Sheets

(56) References Cited

U.S. PATENT DOCUMENTS

| | | | |
|---|---|---|---|
| 5,927,648 A * | 7/1999 | Woodland | 244/118.1 |
| 6,250,196 B1 | 6/2001 | Sanderson | |
| 2003/0071170 A1 | 4/2003 | Hilbert | |
| 2008/0202326 A1 * | 8/2008 | Carroll et al. | 89/38 |
| 2010/0126338 A1 | 5/2010 | Rastegar et al. | |

* cited by examiner

REMOTE WEAPON STATION, IN PARTICULAR FOR AIRCRAFT, SUCH AS FIXED-WING AIRCRAFT

This application is a National Stage Application of PCT/IB2012/001886, filed 18 Sep. 2012, which claims benefit of Serial No. TO2011A000853, filed 23 Sep. 2011 in Italy and which applications are incorporated herein by reference. To the extent appropriate, a claim of priority is made to each of the above disclosed applications.

BACKGROUND

The present invention is relative to a remote weapon station, in particular for aircraft, such as fixed-wing aircraft.

In the military technical field, the use of remote weapon stations (also called RWS) is known, which can be installed on vehicles, such as land vehicles, water vehicles and aircraft.

Generally, remote weapon stations are designed to be installed on a vehicle in such a way as to allow an operator, who is on board the vehicle, to fire ammunitions from a remote position or from a position that is far from the firearm used. In this way, the operator is able to act and shoot on board the vehicle, though being in a protected and sheltered position, where, in particular, he is protected against the enemy's counterattack.

PRIOR ART

The remote weapon stations of the known type, which are designed according to the preamble of claim 1, present some drawbacks.

A drawback resulting from the remote weapon stations of the type described above consists in the fact that they can be univocally designed and manufactured as a function of the aircraft in which they will be installed. More in detail, they use manual target aiming systems, which are specifically installed on the aircraft on which they are assembled and their operating mode, as a consequence, results from—and depends on—said systems. Furthermore, the overall structure and the dimensions of the remote weapon stations according to the prior art cannot be adjusted to different types of aircraft.

SUMMARY OF THE INVENTION

One object of the present invention is to provide a remote weapon station, which is able to solve this and other drawbacks of the prior art and which, at the same time, can be produced in a simple and economic fashion.

According to the present invention, this and other objects are reached by means of a remote weapon station having the features set forth in appended claim 1.

BRIEF DESCRIPTION OF THE DRAWINGS

Further features and advantages of the present invention will be best understood upon perusal of the following detailed description, which is provided by way of example and is not limiting, with reference to the accompanying drawings, which specifically illustrate what follows.

DETAILED DESCRIPTION

Figure 1:
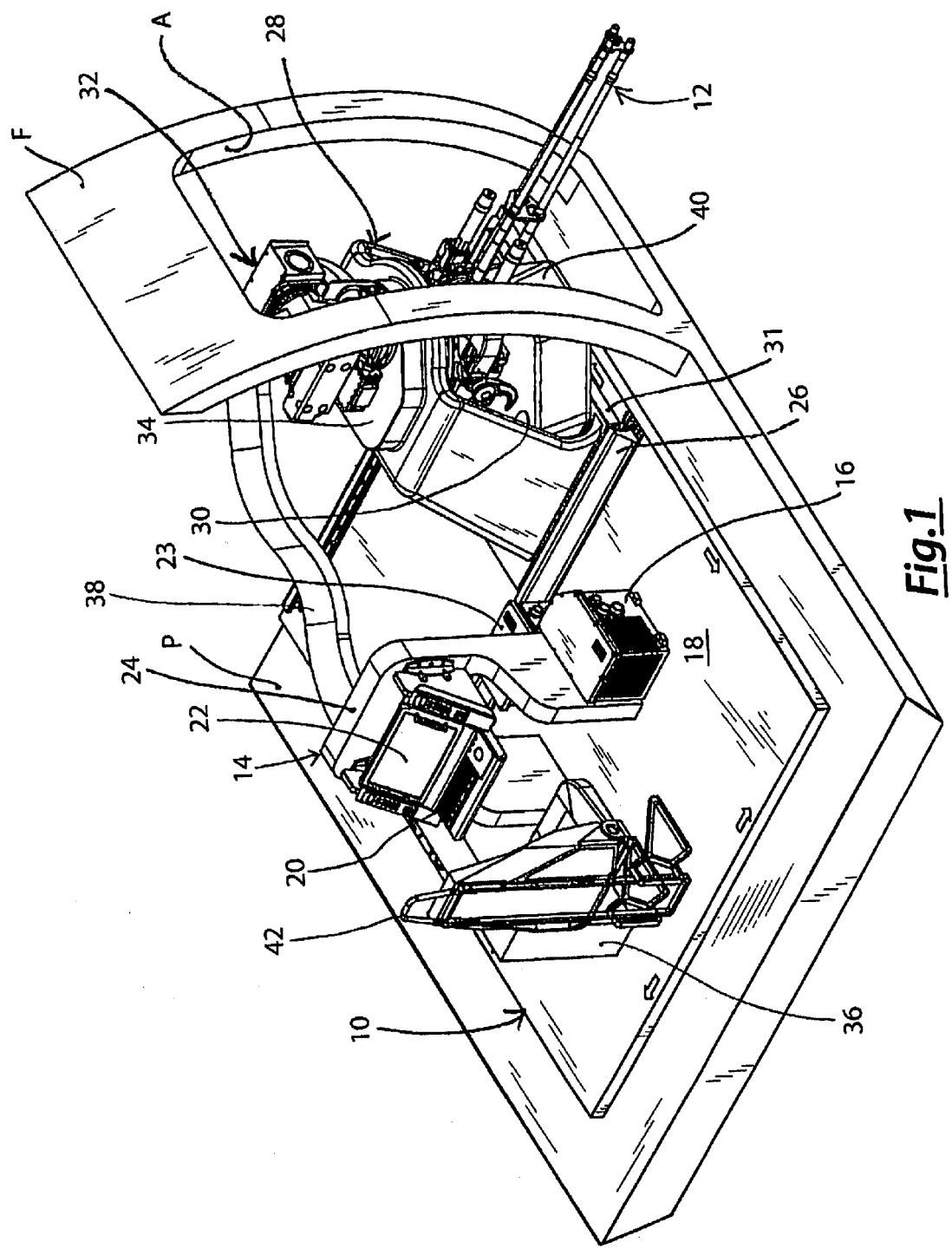
FIG. 1 shows a prospective view of a remote weapon station according to an illustrative embodiment of the present invention and assembled on an aircraft, which is only partially visible.

With reference to the drawings, number 10 indicates, as a whole, an illustrative embodiment of a remote weapon station according to the present invention. Said remote weapon station 10 is specifically adapted to be assembled on an aircraft, preferably but not necessarily a fixed-wing aircraft, such a transport aircraft. In the embodiment shown in the figures, remote weapon station 10 is assembled inside a fuselage F (only partially visible), for example on a loading deck or floor P, of a transport aircraft.

Remote weapon station 10 comprises a firearm 12, which is able to fire ammunitions against a mobile or fixed target, and a remote control board or panel 14, which is arranged at a distance from said firearm 12 and is configured to be activated by an operator, so as to control said firearm 12.

Optionally, remote weapon station 10 comprises, furthermore, a power supply unit 16, adapted for supplying power to said remote control assembly 14.

The remote weapon station comprises, furthermore, a platform 18, on which remote control assembly 14 and power supply unit 16 are assembled. Platform 18 is fixed, preferably in a removable manner, on the aircraft, for example inside fuselage F. In the embodiment shown, platform 18 is coupled to loading deck or floor P.

The use of platform 18 makes remote weapon station 10 easier to assemble and disassemble on the aircraft, thus causing remote weapon station 10 to be adjustable to and installable on different types of aircraft.

Preferably, platform 18 is substantially shaped as a parallelepiped.

Advantageously, platform 18 is an air force pallet having modular dimensions (e.g. 2,235 mm×2,743 mm) compared to the loading deck of the aircraft. The air force pallet, in a known fashion, is provided with a standard hooking system, which makes remote weapon station 10 particularly easy to assemble and disassemble using, in a simple and advantageous manner, the mechanical connection interfaces normally present on aircraft. In the embodiment shown, the air force pallet is made of a light alloy, for example aluminum.

Preferably, firearm 12 is of the automatic type and is able to shoot with a continuous fire, for example a machine gun or an automatic cannon of the one-barrel type or of the multi-barrel type or, if necessary, of the Gatling type. By way of mere and non limiting example, firearm 12 can have a caliber with a size selected within the interval ranging from 7.62 mm and 105 mm. In the embodiment shown, firearm 12 is a multi-barrel Gatling machine gun, for example with a caliber of 20 mm and preferably with a high rate of fire. As it can be clear to a person skilled in the art, firearm 12 to be used on platform 10 can be of the automatic or manual type and it can belong to categories that are different from to what described above, for example firearm 12 can be of the so-called "chain gun" or "gas recovery" type.

Preferably, remote control board 14 comprises an interface or an input device 20, which is configured to introduce and or select data (for example, a keypad and/or one or more selection sticks or joysticks), a displaying device 22 (for example, a screen or a display), and a processing unit 23, which is configured to communicate and process data and is connected to input device 20 and to displaying device 22. More preferably, remote control board 14 comprises a console 24, on which input device 20 and displaying device 22 are assembled. Advantageously, input device 20, displaying device 22 and processing unit 23 are all supplied with power by power supply unit 16.

In further embodiments (not shown), remote control board 14 can also be configured to be connected, for data communication, to the control system or network of the aircraft on which remote weapon station 10 is assembled, for example by means of an in-connector (details not shown), adapted to be connected to a communication channel, such as a 15.53 bus of the air force type. In this way, control board 14 is able to receive external signals transmitted by the control system or network of the aircraft on which remote weapon station 10 is assembled. Said external signals can be representative of the attitude of flight and of the speed (for example, in terms of speed vector) of the aircraft and can be provided to processing unit 23.

Preferably, power supply unit 16 is an electrical power supply, for example of the battery type, which is connected to remote control board 14 so as to supply the latter with the electrical power needed to operate in an autonomous manner with respect to the power supply of the aircraft on which remote weapon station 10 is assembled. The battery power supply can be provided by means of a direct current, for example with a voltage of 28V used in the air force field.

In an optional fashion, power supply unit 16 can be provided with a battery charger, which can be connected to batteries, so as to allow them to be charged both on the ground and on the aircraft, in case a supply voltage is available, so as to allow energy to be delivered to the tools supported by remote weapon station 10.

In other embodiments, which are not shown, there can be no power supply unit 16 and the devices available on remote weapon station 10 cab be supplied with power by means of an auxiliary power unit (APU), which is installed on the aircraft on which remote weapon station 10 is assembled.

Remote weapon station 10 comprises, furthermore, a support element 28, on which firearm 12 is assembled so as to be controlled by means of remote control board 14, for example by means of control signals provided by processing unit 23. The orientation of firearm 12 with respect to support element 28 is preferably performed by means of a suitable driving apparatus, for example a known servomechanism (not shown). In the embodiment shown, firearm 12 is assembled on support element 28 as a turret assembly, which is provided with a plurality of machine gun barrels and can be moved by means of the servomechanism controlled by remote control board 14.

In the embodiment shown, support element 28 presents a cavity 30, in which firearm 12 is housed.

Preferably, furthermore, support element 28 is assembled on platform 18 in a mobile manner. More preferably, support element 28 is assembled on platform 18 so as to slide between a non-operating position (FIG. 2) and an operating position (FIG. 1), in which firearm 12 is arranged in a retracted condition and in a projecting position respectively with respect to the perimeter defined by platform 18. Advantageously, the direction with which the assembly consisting of firearm 12 and of support element 28 moves from the non-operating position to the operating position is substantially rectilinear.

Figure 2:
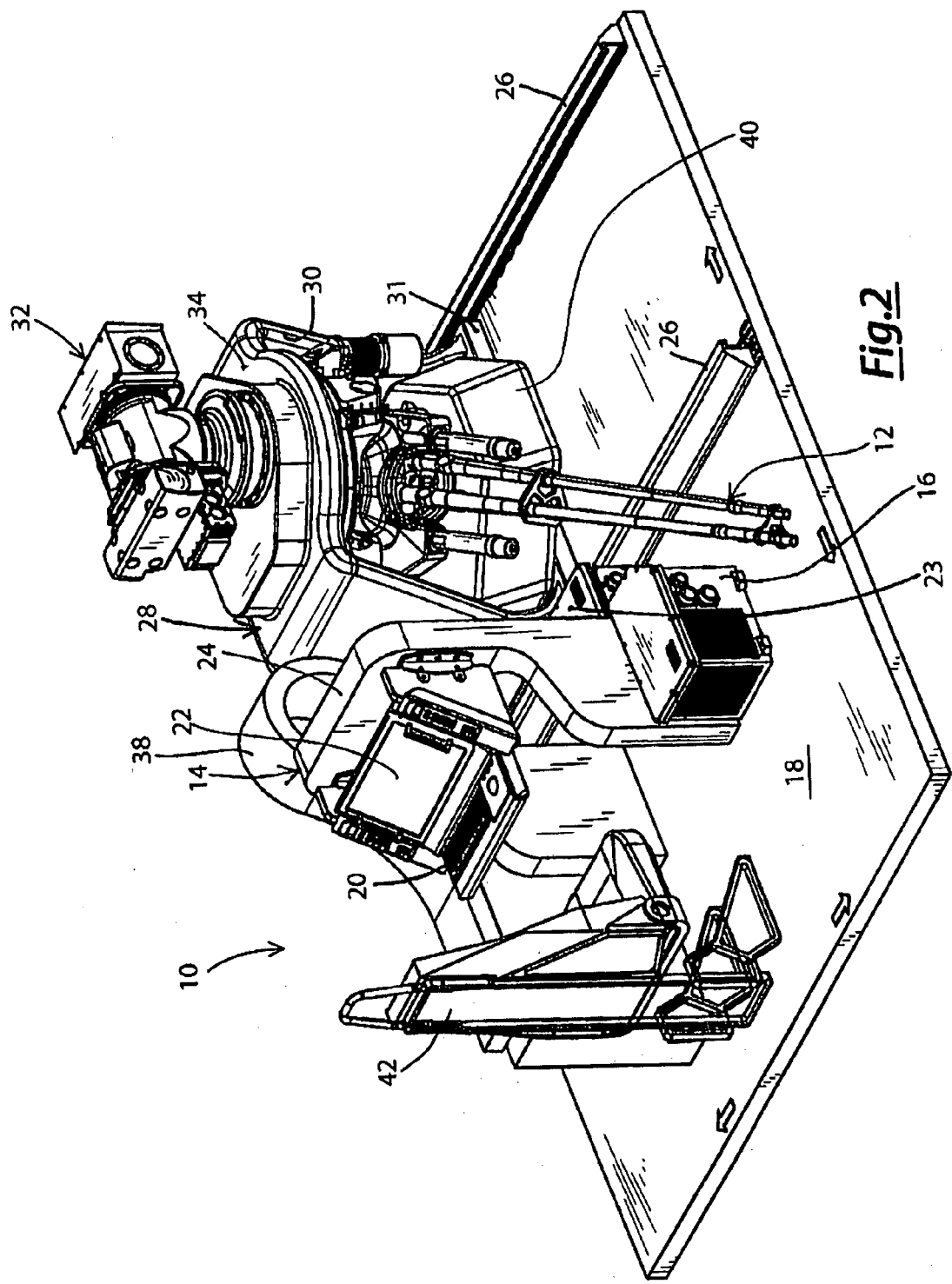
FIG. 2 shows a view similar to that of FIG. 1, but in this case a firearm of the remote weapon station is in a different condition.

More in detail, in the embodiment shown, the operating position corresponds to a condition in which the barrels of firearm 12 substantially project beyond the perimeter defined by platform 18. As shown in FIG. 1, in the operating position, the barrels of firearm 12 project beyond an opening A, which is obtained on the side of fuselage F of the aircraft and is aligned with the movement direction of the assembly consisting of firearm 12 and of support element 28. This arrangement corresponds to a "ready to fire" condition, since it allows the width of the covering fire area associated to firearm 12 to be optimized.

The non-operating position, on the other hand, corresponds to an arrangement in which the barrels of firearm 12 are substantially enclosed in the perimeter defined by platform 18. In the embodiment shown, when firearm 12 is in the non-operating position, the barrels of firearm 12 are slightly rotated towards remote control panel 14, so as to further reduce the space taken up inside fuselage F. Therefore, this arrangement corresponds to a "parking" condition of firearm 12, so that it is completely enclosed by fuselage F of the aircraft.

Preferably, remote weapon station 10 comprises a guide for the movement of support element 28 on platform 18, for example a pair of rails 26, which are assembled on platform 18 and to which support element 28 is coupled in a sliding manner. In alternative embodiments, which are not shown, remote weapon station 10 can also comprise one single rail.

Rails 26 are preferably longitudinal bars, which are screwed onto platform 18, but, as an alternative, they can also stick out and be directly manufactured as one single piece on platform 18 itself.

Advantageously but not necessarily, support element 28 presents a base portion 31, which is coupled to rails 26 in a sliding manner. By way of example, rails 26 have a transverse section presenting a substantially C-shaped part and laterally house complementary protuberances of base portion 31.

In the embodiment shown, support element 28 is adapted to be manually moved between the operating position and the non-operating position by the personnel on board the aircraft on which the remote weapon station is assembled. Though, in other embodiments that are not shown, remote weapon station 10 can be provided with a driving organ (not shown), which is assembled on platform 18 and is configured to be controlled by remote control board 14, so as to move firearm 12 between the operating position and the non-operating position with the guide provided by rails 26. In a preferred manner, said driving organ can be adapted to receive energy from power supply unit 16.

Remote weapon station 10 comprises a known automatic target aiming system 32, which is configured to provide remote control board 14 (for example, processing unit 23) with target aiming signals, which indicate the position of a target that has to be hit by said firearm 12. Automatic target aiming system 32 is supported by support element 28, for example in correspondence to a top portion 34 of its. In the embodiment shown, cavity 30 is arranged in an intermediate position between base portion 31 and top portion 34 of support element 28.

Preferably, automatic target aiming system 32 is configured to be supplied with power by the power supply unit 16.

Preferably, automatic target aiming system 32 comprises a plurality of sensors and devices, which are known in the technical field of reference and cooperate with remote control board 14, so as to provide the above-mentioned target aiming signals. In this way, processing unit 23 is able to perform the necessary ballistic calculations according to predetermined algorithms, thus allowing a correct target aiming and an optimal orientation of firearm 12 with respect to the target. The detail technical features of the single sensors making up the automatic target aiming system and the procedure followed by the relative algorithms associated to the ballistic calculation are not part of the subject-matter of the present invention and, for sake of brevity, they will not be described in the description below. In the embodiment shown, said sensors comprise a view system (which can comprise a day video camera and a night video camera with independent axes), a target distance sensor (for example, a laser range finder), a stabilization sensor (for example, of the gyrostatic type) for detecting the variations of the attitude of flight of the aircraft, a position sensor associated to firearm 12 (for example, a plurality of angular position transducers of the encoder type), and a navigation system (for example, a GPS signal receiver) for calculating the speed vector of the aircraft.

In the embodiment shown, the servomechanism controlling the orientation of firearm 12 with respect to support element 28 is controlled by remote control board 14 (for example, by processing unit 23) as a function of the commands given by the operator (who, for example, acts on input device 20) and as a function of the signals provided by automatic target aiming system 32.

Thanks to the fact that automatic target aiming system 32 is assembled directly on remote weapon station 10, the control of firearm 12 by means of remote control board 14 is completely independent of the control system or network of the aircraft. In this way, remote weapon station 10 is independent of the aircraft and can constitute a "stand alone" system with respect to the latter. Furthermore, the optional use of power supply unit 16 causes remote weapon station 10 to be also potentially independent of the aircraft in terms of power supply.

Preferably, remote weapon station 10 comprises, furthermore, an ammunition magazine 36, which is assembled on platform 18 in a fixed manner and is adapted to house a quantity of ammunitions, and a shot guide belt 38, which connects firearm 12 to ammunition magazine 36 and is adapted to feed the ammunitions or cartridges to firearm 12. Shot guide belt 38 is preferably extendable between an extended condition (FIG. 1) and a contracted condition (FIG. 2), which correspond to the operating position and to the non-operating position of firearm 12 respectively.

Preferably, remote weapon station 10 comprises, furthermore, a shell case collector or container 40, which is associated to firearm 12 and is adapted to receive the shell cases after the cartridges have been separated by firearm 12. Advantageously, shell case container 40 is assembled on support element 28, for example in cavity 30. In the embodiment shown, shell case container 40 is arranged between firearm 12 and base portion 31.

Preferably, remote weapon station 10 comprises, furthermore, a seat 42, which is assembled on platform 18 in front of control board 14 and on which an operator can sit.

In the embodiment shown, control board 14, and preferably seat 42, is arranged on the platform in a lateral position with respect to the sliding direction of support element 28.

Naturally, the principle of the present invention being set forth, the embodiments and the implementation details can be widely changed with respect to what described above and shown in the drawings as a mere way of non-limiting example, without in this way going beyond the scope of protection provided by the accompanying claims.

KEY TO THE DRAWING REFERENCES

F Fuselage
A Opening
P Floor
10 Remote weapon station
12 Firearm
14 Remote control board or panel
16 Power supply unit
18 Platform
20 Input device
22 Displaying device
23 Processing unit
24 Console
26 Rails
28 Support element
30 Cavity
31 Base portion
35 Automatic target aiming system
34 Top portion
36 Ammunition magazine
38 Shot guide belt
40 Shell case collector or container
42 Seat

The invention claimed is:

1. Remote weapon station a fixed-wing aircraft; said remote weapon station comprising:
   a firearm, for firing ammunitions against a target;
   a remote control board or panel, arranged at a distance from said firearm, and is configured to be activated by an operator, so as to control said firearm;
   an automatic target aiming system, for providing said remote control board with target aiming signals, which indicate the position of a target that has to be hit by said firearm;
   a platform, on which said remote control board is assembled and which is adapted to be fitted to said aircraft; and
   a support element assembled on said platform, which supports said automatic target aiming system and houses said firearm controlled by said remote control board as a function of said target aiming signals;
   wherein said support element is slidably mounted on said platform to slide between a non-operating position, in which said firearm is arranged in a retracted position, and an operating position, in which said firearm is arranged in a projecting position with respect to a perimeter defined by said platform;
   the orientation of said firearm with respect to said support element being configured to be controlled by said remote control board as a function of the command given by said operator and the signals provided by said automatic target aiming system;
   at least one rail supported by said platform and on which said support element is slidably coupled;
   wherein said support element comprises:
      a base portion which is slidably coupled to said at least one rail;
      a top portion supporting said automatic target aiming system;
      a cavity arranged in an intermediate position between said base portion and said top portion, and which houses said firearm.

2. The remote weapon station according to claim 1, wherein said firearm is assembled on said support element as a turret assembly.

3. The remote weapon station according to claim 2, wherein said turret assembly is provided with a plurality of machine gun barrels and movable by said servomechanism controlled by said remote control board.

4. The remote weapon station according to claim 3, wherein said barrels of said firearm are configured to be slightly rotated towards said control remote panel, when said support element is in said non-operating position.

5. The remote weapon station according to claim 1, wherein said platform is a modular pallet.

6. The remote weapon station according to claim 1, further comprising a power supply unit, assembled on said platform and configured to supply power to said remote control board and to said automatic target aiming system.

7. The remote weapon station according to claim 1, further comprising a seat, assembled on said platform in front of said control board and on which said operator can sit.

8. Aircraft comprising a remote weapon station according to claim 1.

9. Aircraft according to claim 8, comprising a fuselage having a lateral opening and a floor, to which said platform is fitted, and wherein, when said support element is arranged in the operating position, said firearm protrudes from said opening, and when said support element is arranged in the non-operating position, said firearm is completely contained in said fuselage.

* * * * *